United States Patent Office 3,337,755
Patented Aug. 22, 1967

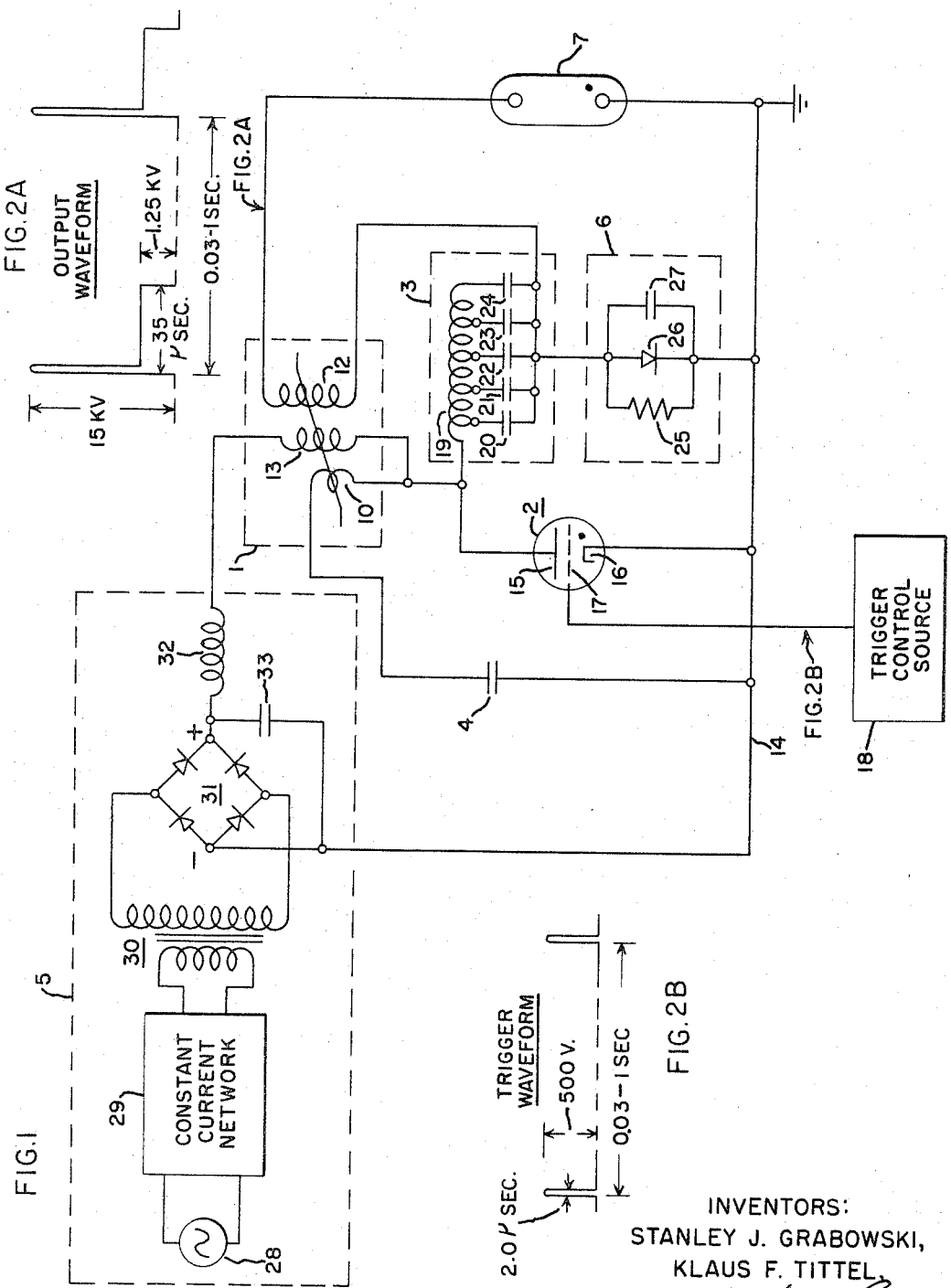

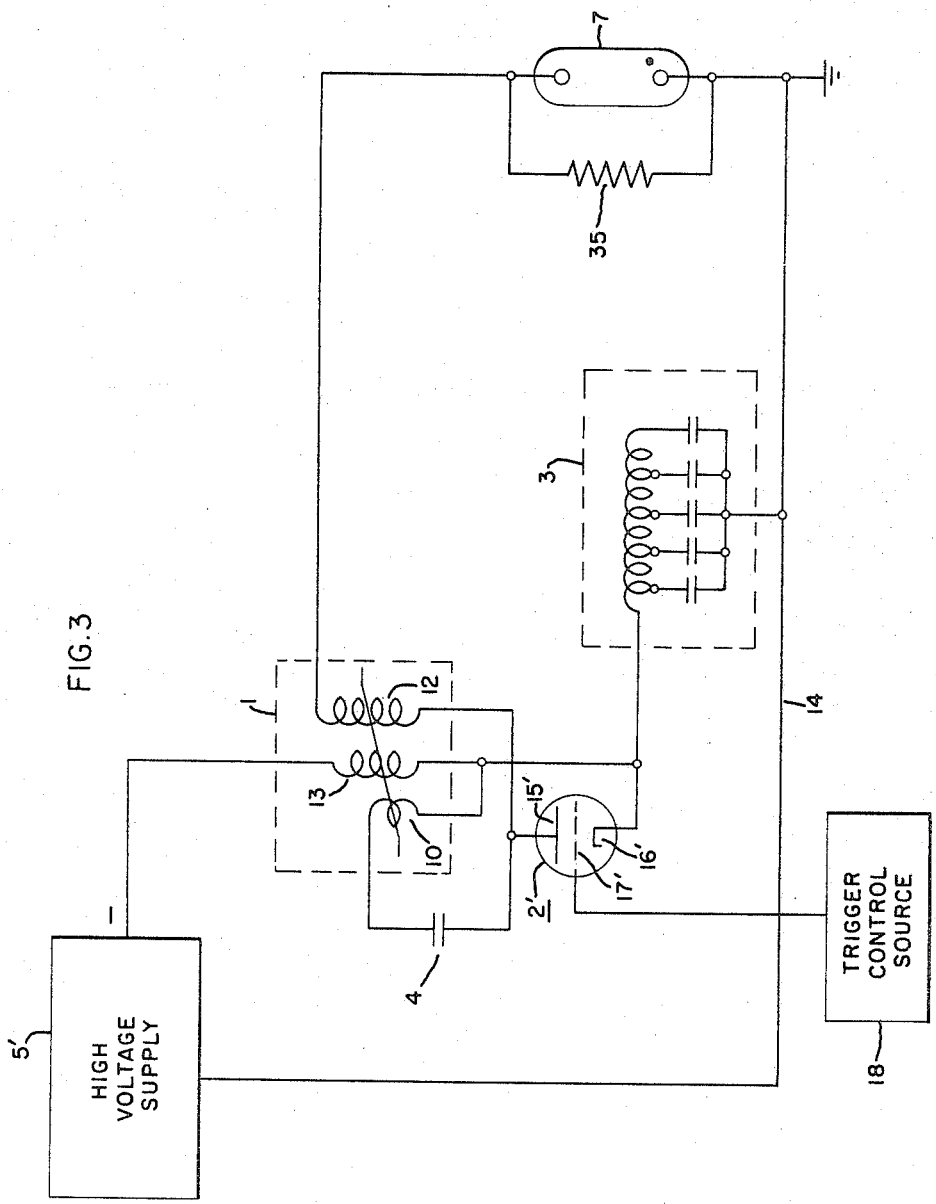

3,337,755
PULSE GENERATOR
Stanley J. Grabowski, Fayetteville, and Klaus F. Tittel, Schenectady, N.Y., assignors to General Electric Company, a corporation of New York
Filed Apr. 10, 1964, Ser. No. 358,888
10 Claims. (Cl. 307—106)

ABSTRACT OF THE DISCLOSURE

The present invention relates to pulse generators and more particularly to pulse generators for recurrently supplying a composite pulse consisting of a high voltage trigger pulse superimposed upon a high energy pulse of relatively longer duration.

This composite pulse is produced by the operation of a single electrically controlled switching device coupled to a saturable transformer, in a circuit arranged to facilitate the joint discharge of two energy storage means into a load. The load is connected in circuit with the transformer secondary. The first energy storage means, typically a capacitor, is coupled to the transformer primary. Upon discharge, it produces the trigger portion of the composite pulse in the transformer secondary which is thereby coupled to the load. This discharge also produces transformer saturation. The second energy storage means, a pulse forming network for producing the power portion of the composite pulse, is also connected in circuit with the transformer secondary and the load. Upon operation of the discharge device, the secondary winding of the transformer due to transformer saturation becomes an efficient low impedance path for coupling the energy stored in the pulse forming network to the load. Discharge of the pulse forming network into the load provides the power portion of the composite pulse.

---

Composite pulse waveforms of this nature are of particular utility for energization of gas discharge devices such as xenon flash tubes, gas laser devices, and others. Gas filled discharge devices generally exhibit a negative resistance characteristic, which implies that until arc over or breakdown has occurred, that a high impedance is exhibited to energization at ordinary operating potentials. However, after arc over or breakdown has occurred, the device exhibits a high conductivity to these same operating potentials. Ordinarily when it is desired to energize such gas filled devices, it is conventional to apply a transient or trigger pulse at the moment that firing is desired at a voltage substantially in excess of that required for normal operation. Once the device is "fired," the lower operating potentials then provide for energization and maintenance of the arc in a more continuous fashion. Typical values of the trigger pulse required for firing such devices are from 4 to 15 kv., depending upon arc length, gas pressure, etc., with a duration measured in a few microseconds or fractions thereof. In many practical circuits, the actual operating potential is typically 1 to 3 kv., dependent again upon the device.

The current and voltage requirements for the respective triggering and operating potentials are quite dissimilar and thus tend to suggest essentially distinct power supply measures.

The present invention is intended to supply the demand for means for effecting recurrent firing of such gas discharge devices. In practical applications of the present invention, it may be desired that the firing rate of the utilization device controllably assume a value of from a few hundredths of a second to a few seconds, with the duration of individual firing periods being measured in tens of microseconds, typically 20 to 100. The present invention may be readily applied over a wide range of values for either time parameter, and the firing rate is readily controlled.

The requirement of recurrent operation compounds the energization problem. On the one hand; different voltage and current demands for triggering and operating potentials dictate essentially distinct power supply measures and rather substantial isolation between the two, as for instance to avoid mutual loading effects. On the other hand; recurrent operation dictates that both supply measures work with a high degree of synchronization; e.g., that the trigger pulse occur near the beginning of the power pulse, and that one supply not be on without the other to insure immunity from accidental firing. These last two considerations militate against isolation.

It is to these aspect of the problem of recurrent energization of gas discharge devices that the present invention is addressed. The present invention, accordingly, has as an object the provision of a novel pulse generator for generating a composite pulse which includes both a trigger component for firing the gas discharge device and a power pulse component for energization of the device over a definite period of time.

It is a further object of the present invention to provide a pulse generator for recurrently supplying a composite trigger and power pulse at a repetition rate which can be readily controlled for recurrent operation of a gas utilization device.

It is another object of the present invention to provide an improved pulse generator wherein the initiation of the trigger pulse and the power pulse are controlled by a single electrically controlled switching device to insure against accidental or inadvertent operation.

It is still another object of the present invention to provide an improved pulse generator for providing a composite pulse generator having both trigger pulse and power pulse components, wherein the respective sources of the individual pulse components operate without mutual loading and wherein the initiation of the trigger pulse and power pulse are controlled by a single electrically controlled switching device.

These and other objects are achieved in accordance with the invention by a novel combination comprising a saturable core transformer having a primary, secondary and reset winding; a first energy storage circuit including a storage capacitor connected in series with said primary winding; a second energy storage circuit including a pulse forming network; suitable output terminals for connection to a utilization device; and an electrically controlled switching device such as a thyratron or ignitron connected in series with the storage capacitor for discharging the same through the primary winding of the transformer and causing a pulse to appear in the secondary winding. The switching device is also connected in series with the pulse forming network, the secondary winding and said output terminals, for completing the path for discharging the pulse forming network into a utilization device coupled to the output terminals.

By this circuit configuration, operation of the switching device effects a discharge of both the capacitor which supplies the trigger waveform to the utilization device and a discharge of the pulse forming network which supplies the power pulse to the utilization device. The trigger pulse is arranged to saturate the transformer core so that the transformer secondary presents a minimum impedance to the power pulse. Similarly, the distributed and stray reactances of the pulse forming network present a low impedance path across the pulse forming network to the trigger pulse. Thus mutual interaction between the sources of the two waveforms is minimized.

In both inventive embodiments, the saturable core is reset by the passage of charging current through the reset winding into the storage capacitor and pulse forming networks.

In accordance with a first embodiment of the invention wherein applicants' novel pulse generator is supplied by a source of direct potentials having the positive terminal ungrounded, one terminal of the pulse forming network is coupled to the anode of the electrical switching device and the other terminal to the transformer secondary. The latter terminal of the pulse forming network is returned to ground through a rectifier poled to pass charging current. The cathode of the switching device is grounded as is the storage capacitor.

In accordance with a second embodiment of the invention wherein applicants' novel pulse generator is supplied by a source of direct potentials with the negative terminal ungrounded, one terminal of the pulse forming network is directly grounded. The electrical switching device has its anode jointly coupled to the storage capacitor and to one terminal of the transformer secondary. Its cathode is coupled to the ungrounded terminal of the pulse forming network. For charging the storage capacitor, a resistance is provided coupled between the other terminal of the transformer secondary and ground, thus paralleling the pulse amplifier output terminals.

The subject matter of the invention is more particularly pointed out and distinctly claimed in the concluding portion of the specification. For a more comprehensive understanding of the invention, reference is now made to the subsequent discussion taken in connection with the drawings, in which:

FIGURE 1 illustrates a first exemplary embodiment of the invention;

FIGURES 2A and 2B illustrate waveforms existing respectively at the output of the pulse generator and at a control voltage input terminal; and FIGURE 3 illustrates a second exemplary embodiment of the invention.

As illustrated in FIGURE 1, applicants' novel pulse generator has as its principal components a saturable transformer 1, a thyratron 2, a pulse forming network 3, a storage capacitor 4, DC power supply means 5, and a reverse clipper-charging rectifier circuit 6. The pulse forming network is arranged to suitably energize a gas discharge device 7 such as a xenon flash tube.

The saturable transformer 1 has a primary winding 10, a secondary winding 12, and a reset winding 13. The primary winding 10 has one terminal connected to a terminal of reset winding 13. The other terminal of the primary winding 10 is connected to the storage capacitor 4 which in turn is connected to ground bus 14. The junction between the primary winding 10 and reset winding 13 is connected to the anode 15 of the thyratron 2. The thyratron cathode 16 is connected to the ground bus 14 and the thyratron control grid 17 is connected to source 18 of trigger control potentials. The remaining terminal of the reset winding 13 is connected to the positive terminal of the high voltage supply 5.

The pulse forming network 3 comprises a tapped inductor 19 having five storage capacitors 20 through 24 respectively connected in standard transmission delay line configuration respectively to four taps and the remote end terminal of the inductor 19. The other end terminal of the inductor 19 is connected to the anode 15 of thyratron 2. The other terminals of each of the five storage capacitors 20 through 24 are connected together and in turn to one end terminal of the secondary winding 12 of the saturable transformer. The other end terminal of the secondary winding 12 is connected to the gas discharge device 7 at a terminal thereof remote from ground. The other terminal of device 7 is connected to ground bus 14. In addition, the common terminals of the capacitors 20 through 24 are connected to the inverse clipper-charging rectifier circuit 6, comprising resistor 25, diode 26, capacitor 27, all connected in parallel to the ground bus 14.

The high voltage DC supply circuit 5 comprises a source 28 of alternating current potentials of moderate voltage coupled through a constant current network 29, to a high voltage transformer 30. The high voltage transformer 30 is in turn coupled to a bridge rectifier 31, the positive terminal of which is connected through filter inductor 32 to the reset winding 13 as previously described, and the negative terminal of which is coupled to the ground bus 14. Capacitor 33 coupled between the positive rectifier terminal and ground cooperates with the inductor 32, to form a choke input transient elimination filter.

Recapitulating the circuit connections of the invention, it may be seen that the output of high voltage supply 5 is serially applied through the reset winding 13 to the pulse forming network 3 and thence through the inverse clipper-charging rectifier circuit 6 to ground. Similarly, the output of high voltage source 5 is also serially applied through the reset winding 13, the primary winding 10, and the storage capacitor 4 to ground. Thus both the pulse forming network 3 and capacitor 4 become charged.

The thyratron 2, upon firing, may be seen to complete a common discharge path to ground for both the pulse forming network 3 and the storage capacitor 4. The discharge path of storage capacitor 4 is coupled through the saturable transformer 1 to the secondary winding 12 of the saturable transformer, so that the serial connection of that secondary winding 12 and the pulse forming network 3 across the terminals of the gas discharge device 7, effects a serial combination of discharge voltages applied thereto.

Thus a composite waveform representing the joint discharge of the storage capacitor 4 and pulse forming network 3, as illustrated in FIGURE 2A, is applied to discharge device 7. This waveform comprises a high voltage spike of a few microseconds duration achieving a typical voltage maximum of 15 kv., attributable to the discharge of capacitor 4 superimposed upon the leading edge of a power pulse of typically 35 microseconds duration, attributable to the discharge of the pulse forming network 3. This will now be explained in greater detail below.

The high voltage DC supply circuit 5 is a practical application is designed to provide 2500 volts DC output at 0.32 amp. It is supplied an alternating voltage input from the source 28 at 120 volts, 400 cycles per second. The constant current network coupled to the source 28 is of the type known as a "Monocyclic Network" and consists of a bridge having one diagonal pair of output terminals coupled to the source 28 and the second diagonal pair of output terminals coupled to the primary of high voltage transformer 30. One pair of diagonal arms of the bridge in the present practical application may each consist of a capacitor of 23.5 microfarads while the other diagonal pair of the bridge may each consist of an inductor, typically adjustable, of 7 millihenries. The high voltage output transformer 30 may be of conventional design and the bridge rectifier 31 also conventional design. In view of the high voltage requirement, however, when semiconductor rectifiers are employed, each arm of the rectifier bridge may require the use of a number of individual rectifiers connected in series. In the present practical application, each arm employs seven type 1N547 diodes.

When the high voltage supply 5 is used in the present practical application, transients may tend to be returned to the power supply circuit in operation of the pulse generator. The indicator 32, which may have a typical value of 300 microherines, and the capacitor 33, which may have a value of .005 microfarad, suppresses these transients and protects the power supply components. Finally, dependent upon the specific application of the circuit, it may be desirable to provide a voltage limiter within the power supply. This may best be provided at the output of constant current network 29 just prior to the primary of the transformer 30.

The power supply 5 now described is suitable for operation of the pulse generator of the invention for energization of a flash tube and having a waveform illustrated in FIGURE 2A. The power supply may take other forms. Its prime requisites are that it provide output current at the required voltage levels, preferably with internal current limiting for operating and design efficiency, and with immunity to transients reflected from the pulse generator back into the power supply.

The saturable transformer 1 in the present practical application has a primary winding of two turns and secondary and reset windings each of 40 turns. The storage capacitor 4 may have a vale of .1 microfarad. The polarity of the primary and secondary windings are such that discharge of capacitor 4 and the pulse forming network 3 each induce flux in the same direction in the saturable core, tending to shift the core to a first saturated condition. The core material is of the square loop variety, having an amount of core material selected so that the normal charging currents flowing in the reset winding 13 associated with charging the capacitor 4 and pulse forming network 3 will reset the core to a second saturated condition in a small fraction of the duty cycle. In the present practical application, the core is a circular loop having a 3½ inch outer diameter and 2½ inch inner diameter formed of 2 mil 1 inch tape. The material may be that known as Deltomax magnetic tape. Similarly, the capacitor 4 and the number of turns of the primary winding 10 are chosen with respect to the core to insure switching of the core to the first saturated condition with the discharge of the capacitor 4.

The pulse forming network 3 is formed of an inductor having five segments each of 2½ microhenries inductance and five capacitors each of 2½ microfarads. This selection of impedances creates a characteristic impedance of approximately an ohm, which is slightly, typically 5% to 10%, in excess of the impedance of the flash lamp (also about 1 ohm under the conditions indicated). The energy storage of the network operating at a maximum voltage of approximately 2500 volts is such as to provide a maximum energy per pulse of approximately 40 joules.

The pulse forming network exhibits a low impedance path to the trigger pulse due to direct and stray inductances and capacitances. The impedance of a single section of the pulse forming network 3 may be seen to include a small capacitive reactance—that attributable to a 2.5 microfarad condenser in series with a 2.5 microhenry inductance. In effect, however, even this impedance is larger than that exhibited to the trigger pulse. The presence of larger capacitors 20 and 24 and other strays effectively create parallel current paths which tend to reduce the total impedance of the network to a fraction approaching a fifth of that of any single section. Compared to the four-microhenry impedance in the secondary winding in which the trigger pulse is developed, the effective impedance is thus quite small.

Finally, in order to insure discharge of the pulse forming network under quiescent conditions, each of the capacitors 20 through 24 may be shunted by a large resistance, typically of .4 megohm, a value which does not substantially effect other characteristics of the network.

The inverse clipper-charging rectifier at 6 is seen to comprise a resistor 25, rectifier 26, and capacitor 27 all in shunt. This network 6, in the present practical example, is formed of a series of seven such components, when employing a diode of the IN1128A type. In addition, one may place a small resistance in series with the entire network and a capacitor in shunt therewith for a transient suppression in protection of the diode 26. As indicated previously, the diode 26 is poled in the direction to facilitate charging of the pulse forming network 3 from source 5.

One may now consider the operation of applicants' novel pulse generator in the charging phase of operation, during which no voltage is applied to flash tube, but preparatory thereto. It has been seen that the source 5 provides current flowing through the reset winding 13 and the primary winding 10 into the capacitor 4. Similarly the power supply 5 provides charging current for the pulse forming network 3 by a current path flowing through the reset winding 13, the inductor segments of the pulse forming network 3, and the capacitors 20 through 24 of the pulse forming network 3 and finally the inverse clipper-charging rectifier 6. As previously indicated, the constant current effect of the power supply 5 is to hold the current supplied to the pulse generator to approximately .32 amp. In actual practice the pulse forming network 3 and the capacitor 4 are charged to approximately the output voltage of the source 5 prior to flashing the tube 7.

The thyratron 2 may be of the type EG & G 7322/1802, ceramic hydrogen thyratron. In a typical application, the control pulse may be of 500 volts with a typically 2 microsecond duration and a periodicity within the desired typical range of from .03 second to 1 second. Operating under the present conditions, the thyratron may be regarded as exhibiting an impedance of .01 of an ohm when fired. One may generally employ either thyratrons or ignitrons as switching devices. Silicon controlled rectifiers are also applicable in certain special applications where their voltage limitations and transient response are accommodated.

The flash tube 7, for instance, may be of the type FX38A (EG & G), the FT90B (GE), the XE1 (PEK), or XE2 (PEK), as well as any of a number of different types of gas tubes, with appropriate circuit adjustment.

One may now consider the operation of the pulse forming network in operation of flash tube 7. The pulse 2A from the trigger source 18 is employed to turn on the thyratron 2. As explained earlier, turning on the thyratron effectively grounds the anode 15 through a very low impedance path and at the same time grounds one terminal of the primary winding 10 and the end terminal of the pulse forming network 3 connected to anode 15. Instantly, the capacitor 4 commences to discharge the current therein stored through the primary winding 10. This causes a sharp spike which may rise to 15 kv. to appear by transformer action in the secondary 12 of the saturable transformer 1. This spike is directly applied to the electrodes of the flash tube 7, and causes the flash tube 7 to ignite. The path for the spike from the upper end (as viewed in FIGURE 1) of the secondary 12 to the ungrounded terminal of the flash tube 7 is straight forward and involves no intervening impedances other than the natural lead inductances which are preferably kept to a minimum. The plate for the spike from the lower end (as viewed in FIGURE 1) of the secondary 12 to the grounded terminal of the flash tube 7 is more complex, but also quite direct. The principal path is that including the feed through or distributed impedances of the network 3 which is grounded through the discharge path of the now conducting thyratron 2. The other path is the capacitive coupling of the network element 6. The discharge of the capacitor 4 also produces saturation of the saturable core of the transformer 1.

After the application of the 15 kv. pulse, which ionizes the flash tube 7, a long duration pulse is initiated in the pulse forming network 3. The prior grounding of the terminal of the pulse forming network coupled to the anode 15 of the thyratron and the ignitron of the flash tube 7 has completed the current path through the pulse forming network 3, the secondary winding 12 and the end terminals of the flash tube 7. Thus a pulse of typically 35 microseconds at approximately 1.25 kv. is delivered to the flash tube. The internal impedance of the pulse forming network 3 brings about the indicated voltage reduction from the approximately 2.5 kv. stored in network 3. This provides approximately 40 joules of energy per pulse to the utilization device 7.

The initial saturation of the core of the transformer 1 makes the secondary winding 12 of reasonably low inductive impedance, of typically 4 microhenries, and effects only a minor widening of the pulse. That the core is saturated by the trigger pulse also reduces the resistance of the main power pulse. The network 6 offers a relatively high impedance to ground and has no appreciable effect upon the main discharge of the pulse forming network 3.

The mismatch selected between the characteristic impedance of the pulse forming network 3 and the flash tube 7 is selected so that most, but not quite all, of the energy from the network 3 will flow into the flash tube for light production. A remainder, however, is desirable to bringing about a small charge reversal at the input terminal of the pulse forming network 3. Thus, the circuit operation is adjusted with slightly under cricital damping. The effect of this mismatch is to facilitate extinction of the arc in the thyratron 2 and place it in off condition for operation on the next succeeding cycle.

The diode 26 of the component 6 as a secondary portion provides a reverse clipping or damping function in the reverse portion of the oscillatory discharge and together with the associated dissipative and capacitive components limits and dissipates such inverse voltage swings. It has the additional feature of insuring that the pulse forming network 3 will be at substantially ground potential when the charging is recommenced.

The cyclical swing which brings about an extinction of the thyratron 2 may be seen to occur at a faster rate than the normal charging rate from a source 5, and permitting the anode 15 to go momentarily negative to insure extinction.

It may be observed that inventive pulse generating circuit provides a serial connection of the source providing the ignition spike (the secondary winding 12) with the source providing the high energy power pulse (the pulse forming network 3), and this serial connection is achieved without adverse interaction. Thus it may be seen that the high voltage spike is applied directly to the flash tube without adverse loading by the pulse forming network. Likewise, the discharge from the pulse forming network across the flash tube occurs without substantial energy dissipation or intollerable pulse lengthening in its passage through the secondary winding 12, now on a saturated core of the saturable transformer 1.

In addition, it may be seen that the joint application of both the trigger pulse and the power pulse to the flash tube 7 is caused by the firing of the thyratron 2. Operation of the thyratron closes the discharge circuit through the trigger capacitor 4 and also closes the current path through the pulse forming network 3. Thus both trigger and power pulses are applied to the flash tube 7 in a controlled fashion. Finally, the use of a saturating reset winding on the saturable core transformer 1 provides a convenient way for resetting the core during the charging of the capacitor 4 and pulse forming network 3.

The second exemplary embodiment of the invention shown in FIGURE 3 utilizes essentially the same components as that of the first embodiment except for the omission of a reverse clipper-charging rectifier circuit 6. Components that are unchanged have retained the same reference numerals used in FIGURE 1. In addition, the wiring configuration of the second embodiment is modified as will be explained and the circuit employs a source of negative high voltage potentials.

The principal components of the second exemplary embodiment include a saturable transformer 1, which is in all respects like that of the prior embodiment; a switching tube 2', which may either be a thyratron, as employed in the first configuration, or an ignitron; a pulse forming network 3, which is in all respects similar to that of the first embodiment; a storage capacitor 4; a high voltage source 5', which is similar to that of the prior embodiment except for a connection at the output thereof reversing the external polarities; and a flash tube 7, now shunted by resistance 35, typically of 5000 ohms.

A description of the circuit connections and their functions follow. As illustrated, the negative high voltage terminal of the source 5' is connected through the reset winding 13 to the input terminal of the pulse forming network 3, the output terminal of which is connected to the ground bus 14. This path provides for energy storage in the pulse forming network 3.

Similarly, the high voltage source 5' is serially connected in the order recited through the reset winding 13, the primary winding 10, the charge storage capacitor 4, the secondary winding 12, the terminals of the flash tube 7, which are now shunted by resistance 35, to ground. This is the path for charging the storage capacitor 4.

The ignitron or thyratron 2' is connected with its anode 15' to the junction of the storage capacitor 4 with the secondary 12. The cathode 16' is connected to the ungrounded terminal of the pulse forming network 3. Its control electrode 17' is connected to a trigger control source 18.

Thus it may be seen that upon ignition of the switch tube 2' that a first discharge path is provided for the capacitor 4, including the switch tube 2' and the primary winding 10. As in the prior embodiment, discharge of the capacitor 4 causes the generation of a trigger spike in the secondary winding 12, which ignites the flash tube 7, and saturates the core of the transformer 1. Similarly, the ignition of the switch tube 2' closes a low impedance discharge path from the pulse forming network 3, including the switch tube 2'; the secondary winding 12, which due to the saturation of the core is in a low impedance condition; and the flash tube 7. Thus energy is discharged from the pulse forming network 3 into the flash tube 7.

The second embodiment thus functions in a manner closely similar to that of the first embodiment. Operation is under the active control of the switch tube 2' which performs the joint functions of closing the trigger circuit and forming a conductive path permitting discharge of the pulse forming network to the flash tube.

The extinction of the switch tube 2' may be by load adjustment, to effect a transient voltage reversal as explained in the prior embodiment, if a thyratron is employed. If an ignitron is employed, extinction is usually achieved without such precautions by the consequent lowering of the anode voltage to zero as the charge on the pulse forming network decays.

In both exemplary embodiments of the invention, application of the main power pulse to the flash tube can only occur upon the firing of the switching device 2 which is in series with the discharge path of the pulse forming network. The circuit is thus not subject to undesired triggering by accidental line transients. In addition, the same switching device 2, used to complete the discharge circuit for the power pulse, is used to close the discharge circuit for the trigger pulse for ignition of the utilization device. Thus an extremely simple pulse generator for ignition and energization of gas tubes has been devised which is subject to positive and accurate control.

It may be appreciated that applicants' novel pulse generator operates under the direct control of the trigger control source. Accordingly, if one adjusts the trigger control source to fire trigger pulses at a different rate, the pulse generator will respond accordingly. In a practical application, one must, of course, design the circuit for a given range of control so as not to avoid excessive power demands from the voltage supply circuit and properly take into account the extinction times of the various gas discharge devices, and charging rates of the energy storage circuits. One may adjust the power pulse duration, by switching in additional capacitances in parallel with those already present in the pulse forming network.

Many modifications of the circuit of the invention will be obvious to those skilled in the art. Thus, it is intended by the appended claims to cover all such modifications and adaptions as fall within the true spirit and scope of the appended claims.

What is claimed as new and desired to be secured by Letters Patent of the United States is:

1. In a pulse generator for supplying a composite pulse to a load, the combination comprising:
   (a) a saturable core transformer having primary and secondary windings;
   (b) a first energy storage circuit including a first energy storage means connected to said primary winding;
   (c) a second energy storage circuit including a second energy storage means;
   (d) a pair of output terminals for connection to a utilization device;
   (e) an electrically controlled switching device:
      (1) connected in shunt with said first energy storage circuit for controllably discharging said first energy storage means through said primary winding and causing a pulse to appear in said secondary winding, and
      (2) connected in series with said second energy storage means, said secondary winding, and said output terminals for controllably discharging said second storage means into a utilization device coupled to said output terminals, whereby the discharge of both the said storage means is effected by said switching device.

2. The combination set forth in claim 1 wherein said first energy storage means is a capacitor, the discharge of which saturates the core of said transformer.

3. The combination set forth in claim 1 wherein said first energy storage means is a capacitor, the discharge of which produces a short duration trigger pulse in said secondary and saturates the core of said transformer; and wherein said second energy storage means is a pulse forming network for producing a power pulse.

4. The combination set forth in claim 1 wherein said first energy storage means is a capacitor, the discharge of which produces a short duration trigger pulse in said secondary winding and saturates the core of said transformer; wherein said second energy storage means is a pulse forming network for producing a power pulse; and wherein said transformer has a third winding which resets the core of said transformer during charging of said energy storage means.

5. The combination set forth in claim 1 wherein said second energy storage circuit also includes rectification means in series with said second energy storage means poled to permit charging; and wherein said first energy storage circuit, said second energy storage circuit, and said electrically controlled switching device are each mutually connected in parallel, with the cathodes of said switching device and said rectification means being connected to one of said output terminals; and wherein one end of said secondary winding is connected to the junction of said rectification means to said second energy storage means, with the other end connected to the other output terminal.

6. The combination set forth in claim 1 wherein said first energy storage circuit also includes, resistance means shunting said output terminals; and means connecting said primary winding, said first energy storage means, said secondary winding, and said resistance means in series; and means connecting said second energy storage circuit in parallel with said first energy storage circuit.

7. A pulse generator for supplying a composite trigger and power pulse to a utilization device comprising:
   (a) a saturable core transformer having primary and secondary windings;
   (b) a first energy storage circuit including a first energy storage means connected to said primary winding;
   (c) a second energy storage circuit including a second energy storage means and unidirectionally conducting means connected thereto poled to facilitate charging;
   (d) an electrically controlled switching electrical discharge device connected in shunt with said first and second energy storage circuits; and
   (e) a pair of output terminals for connection to a utilization device, one terminal of which is connected to the cathodes of said unidirectional conducting means and said switching device, and the other terminal of which is connected through said secondary winding to the junction of said second energy storage means with the anode of said unidirectionally conducting means, whereby switching of said switching device effects a joint discharge of said energy storage circuits.

8. The pulse generator set forth in claim 7 wherein said transformer has a reset winding connected to said shunt connected storage circuits for switching said core during charging thereof.

9. A pulse generator for supplying a composite trigger and power pulse to a utilization device comprising:
   (a) a saturable core transformer having primary and secondary windings;
   (b) a first energy storage circuit including said primary winding, a capacitor, said secondary winding, and a resistance; all connected in series;
   (c) a second energy storage circuit comprising a pulse forming network connected in shunt with said first energy storage circuit;
   (d) an electrically controlled switching electrical discharge device shunting the serial combination of said primary winding and said first energy storage means and connected in series between one terminal of said secondary energy storage means and said secondary winding to effect a joint discharge of said respective storage circuits; and
   (e) a pair of output terminals for connection to a utilization device connected in parallel with said resistance means.

10. The pulse generator set forth in claim 9 wherein said transformer has a reset winding connected to said shunt connected storage circuits for switching said core during charging thereof.

References Cited
UNITED STATES PATENTS

| | | | |
|---|---|---|---|
| 2,394,389 | 2/1946 | Lord | 307—107 X |
| 2,646,503 | 7/1953 | Winter | 328—67 |
| 2,697,784 | 12/1954 | Blythe | 307—108 X |
| 2,698,900 | 1/1955 | Anger | 307—108 X |
| 3,122,677 | 2/1964 | Flieder | 328—67 X |
| 3,162,786 | 12/1964 | Kapteyn | 320—1 X |
| 3,262,043 | 7/1966 | Heinrich | 320—1 |
| 3,273,075 | 9/1966 | Kennedy | 328—61 X |

MILTON O. HIRSHFIELD, *Primary Examiner.*

J. J. SWARTZ, J. D. TRAMMELL, *Assistant Examiners.*